United States Patent [19]

Krebs et al.

[11] Patent Number: 5,548,631

[45] Date of Patent: Aug. 20, 1996

[54] METHOD AND APPARATUS FOR SUPPORTING AT LEAST TWO COMMUNICATION SERVICES IN A COMMUNICATION SYSTEM

[75] Inventors: Jay Krebs, Crystal Lake; Paul M. Erickson, Palatine, both of Ill.

[73] Assignee: Motorola, Inc., Schaumburg, Ill.

[21] Appl. No.: 131,535

[22] Filed: Oct. 1, 1993

[51] Int. Cl.[6] .................................................. H04Q 7/20
[52] U.S. Cl. ........................ 379/58; 455/53.1; 455/34.1
[58] Field of Search ................................. 379/58, 59, 63; 455/33.1, 54.1, 34.2, 56.1, 15, 53.1, 34.1

[56] References Cited

U.S. PATENT DOCUMENTS

| | | | |
|---|---|---|---|
| 4,672,601 | 6/1987 | Ablay | 379/63 |
| 4,977,589 | 12/1990 | Johnson et al. | 379/58 |
| 5,175,727 | 12/1992 | Maher et al. | 370/58.1 |
| 5,179,721 | 1/1993 | Comroe et al. | 379/59 |
| 5,218,354 | 6/1993 | Hess | 455/54.1 |
| 5,301,359 | 4/1994 | Van den Heuvel et al. | 455/56.1 |
| 5,363,427 | 11/1994 | Ekstrom et al. | 379/58 |
| 5,392,449 | 2/1995 | Shaughnessy et al. | 455/34.1 X |
| 5,420,909 | 5/1995 | Ng et al. | 379/58 |

OTHER PUBLICATIONS

"System 900: The ISDN Approach to Cellular Mobile Radio" M. Wizgall et al. *Electrical Communication*, vol. 63, No. 4 1989.

Primary Examiner—Curtis Kuntz
Assistant Examiner—William G. Trost
Attorney, Agent, or Firm—Steven G. Parmelee

[57] ABSTRACT

Apparatus and method for enabling a single communication system (100) to support at least two communication services. For example, one can support both cellular telephone services and trunked dispatch services by sharing some, but not all, of the system infrastructure. Access control gateways (201) and base stations (203) comprise common infrastructure elements, while two separate processors provide control for each service, these being a communication agent processor (104) to support telephone services, and a dispatch call processor (106) to support dispatch call services. These two independent processors each include a data base (303 and 307) that includes information concerning communication units (204–206) operating within the system. During a call set-up sequence, the access control gateway (201) receives a call request from a communication unit via a base station, and passes the request to the appropriate processor, which uses its corresponding database to support the requested service.

19 Claims, 10 Drawing Sheets

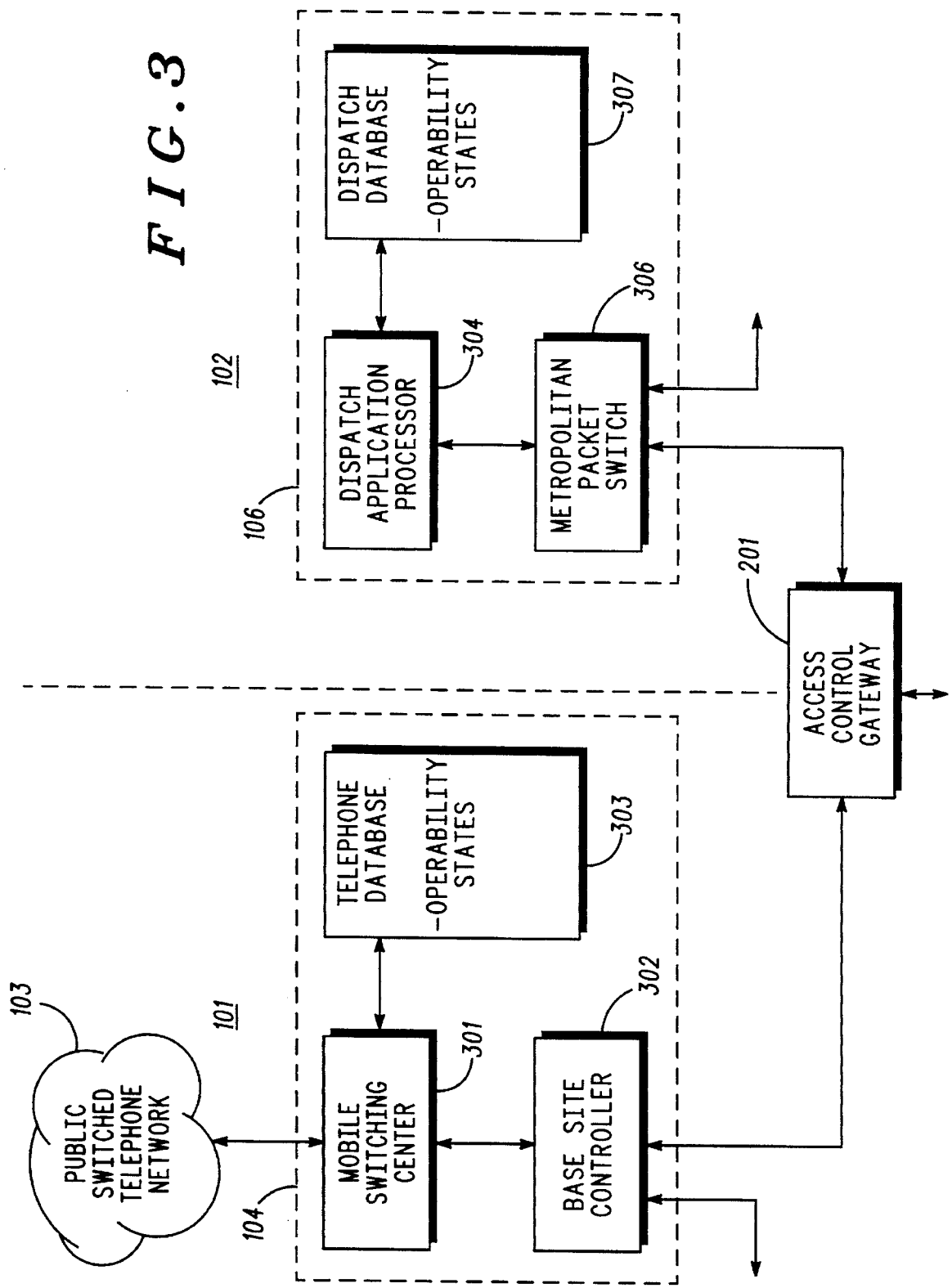

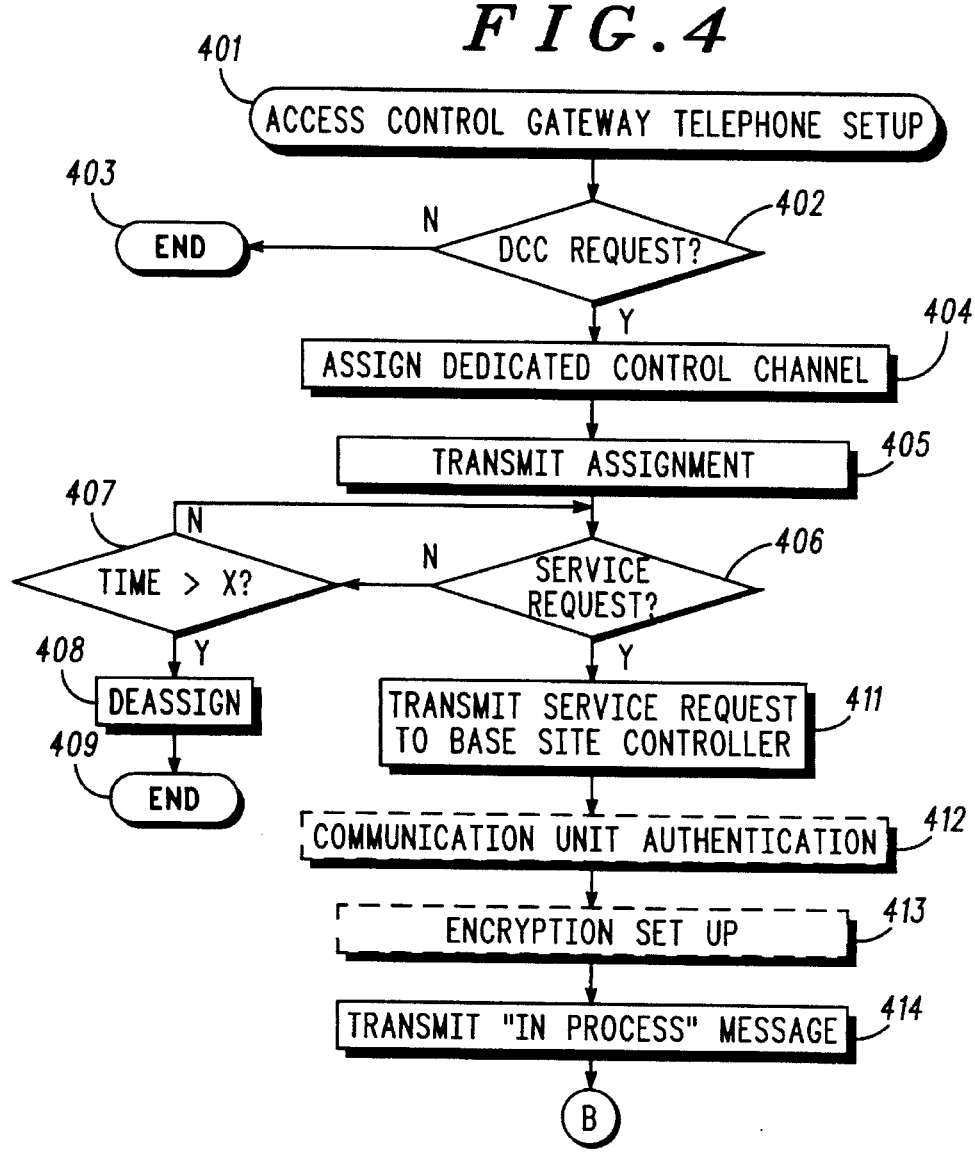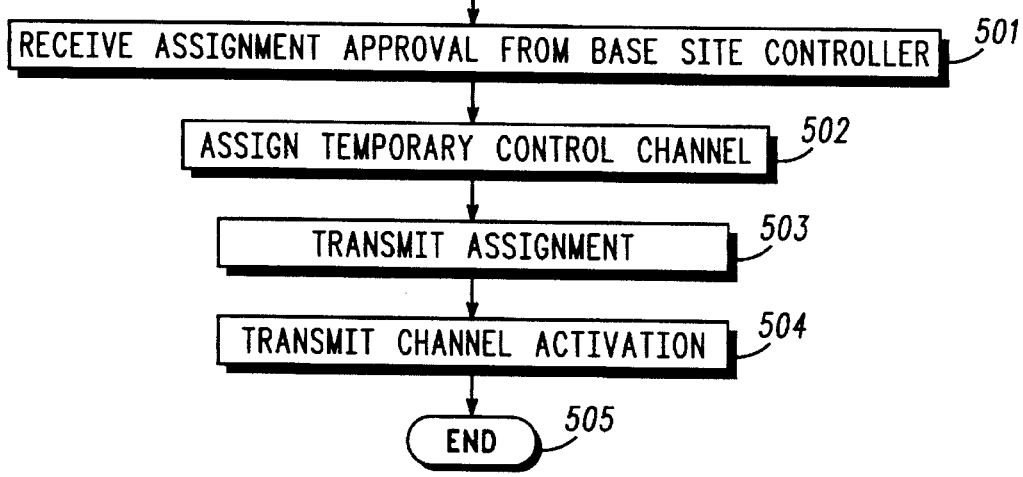

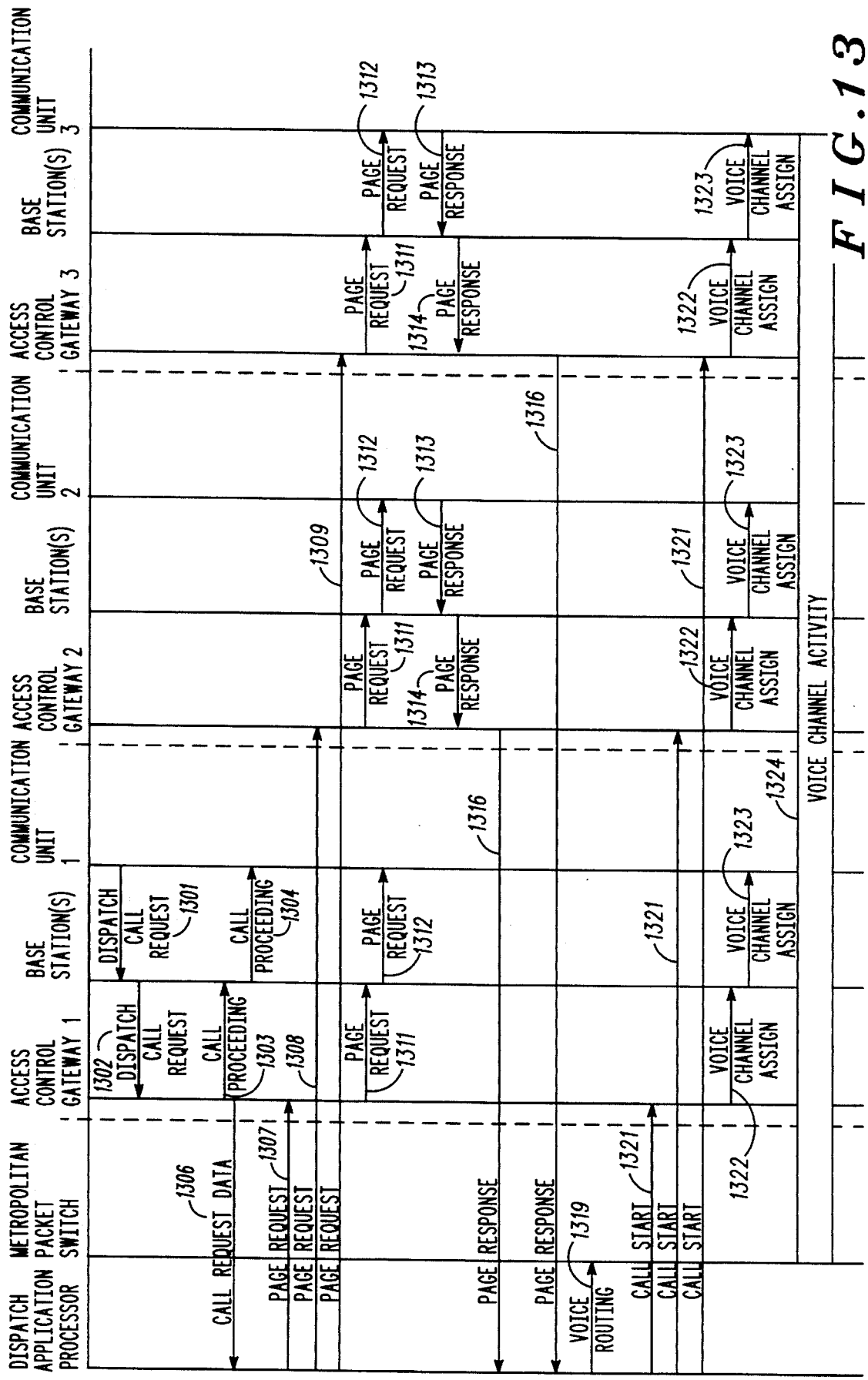

5,548,631

METHOD AND APPARATUS FOR SUPPORTING AT LEAST TWO COMMUNICATION SERVICES IN A COMMUNICATION SYSTEM

TECHNICAL FIELD

This invention relates generally to communication services.

BACKGROUND OF THE INVENTION

Wireless communication systems that utilize radio frequency carriers are well known in the art. Such systems include cellular telephone services and trunked dispatch services. Dispatch services differ from telephone services in a variety of ways, but are perhaps most easily distinguished from one another in that telephone communications are typically between two individuals that are each uniquely and individually identified within the system, whereas dispatch communications allow for communications amongst a group of users, without a need to individually identify each group member before initiating the communication.

Both of these services are typically offered in most populated areas. The telephone services as provided through cellular systems are utilized by those who wish to have person-to-person access through the existing telephone network, and dispatch services are typically utilized by organizations, such as public safety agencies and various business operations, that require communications within groups of mobile users. To date, such services are typically offered by separate systems. In particular, such systems share no infrastructure whatsoever, even when they share a common coverage area.

The infrastructure for such communication systems, including in particular antenna sites and base station facilities, can be quite costly. Further, in addition to cost, in many populated areas there are practical limitations that govern availability of suitable antenna sites, thereby often greatly limiting potential locations for base stations.

A need therefore exists to provide a practical mechanism whereby systems offering these different communication services can share at least some infrastructure elements in order to minimize the overall cost of the infrastructure, and also to best ensure that such services both have substantially equal access to desirable base station locations.

BRIEF DESCRIPTION OF THE DRAWINGS

FIG. 3 comprises a block diagram depicting certain elements of a system configured in accordance with the invention, wherein certain elements are depicted in greater detail.

FIG. 4 comprises a flow diagram depicting operation in accordance with the invention.

FIG. 5 comprises a flow diagram depicting operation in accordance with the invention.

FIG. 13 comprises a timing diagram depicting operation of a system configured in accordance with the invention when supporting a dispatch communication as initiated by a wireless communication unit.

DESCRIPTION OF A PREFERRED EMBODIMENT

Figure 1:
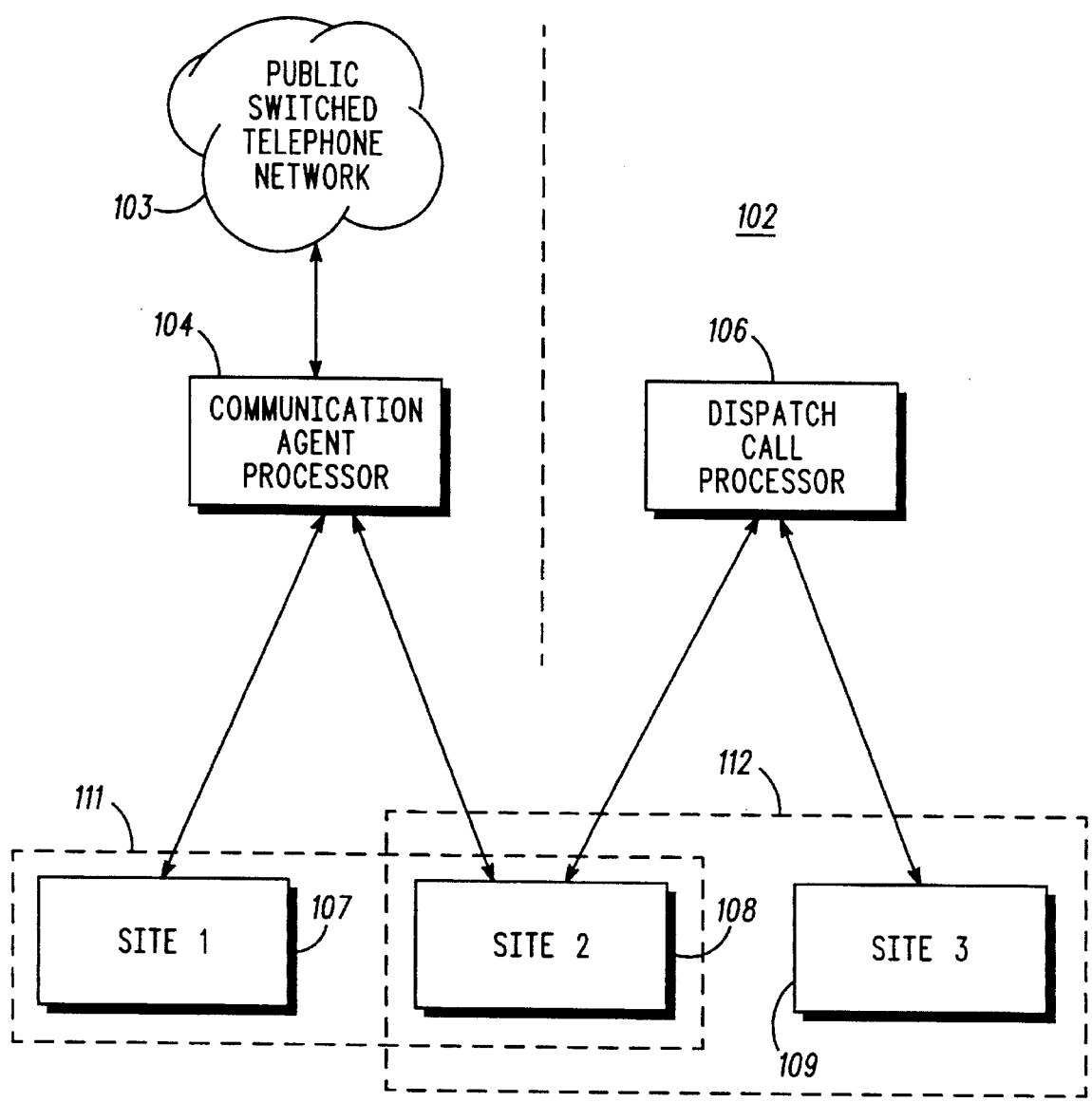
FIG. 1 comprises a block diagram depiction of a system configured in accordance with the invention.

FIG. 1 depicts in general a communication system (100) configured in accordance with the invention. This particular communication system (100) supports both telephone services (101) and dispatch services (102). To support the telephone services (101), the system (100) couples to the public switched telephone network (103) via a communication agent processor (104). The former is well understood in the art, and additional information need not be provided here. The communication agent processor (104) will be described in more detail below. To support the dispatch services (102), the system (100) provides a dispatch call processor (106), which will also be described in more detail below.

These processors (104 and 106) each couple to a plurality of sites (107–109). Each site includes infrastructure as described below, which infrastructure supports wireless communications with mobile communication units. In this particular embodiment, each site may be shared by both processors (104 and 106), or, to suit particular needs of one service or the other, may be coupled to only one processor or the other. For example, as depicted, site 1 (107) couples only to the communication agent processor (104), and site 3 (109) couples only to the dispatch call processor (106). Site 2 (108), however, couples to both processors (104 and 106). So configured, the infrastructure represented by site 2 is shared by both the communication agent processor (104) and the dispatch call processor (106).

Depending upon the needs of a particular application, the sites themselves may also be configured into one or more local areas. For example, in the example depicted, sites 1 and 2 (107 and 108) form a first local area (111), which local area may function in a particular manner to support particular service requirements of the telephone service (101) provided. Similarly, sites 2 (108) and 3 (109) are configured to comprise a second local area (112), which second local area (112) can support particular service requirements that may be needed by the dispatch call processor (106). The present invention readily accommodates the need to provide such local areas as may be required by a particular communication service, even while simultaneously supporting the sharing of at least some site infrastructure.

Figure 2:
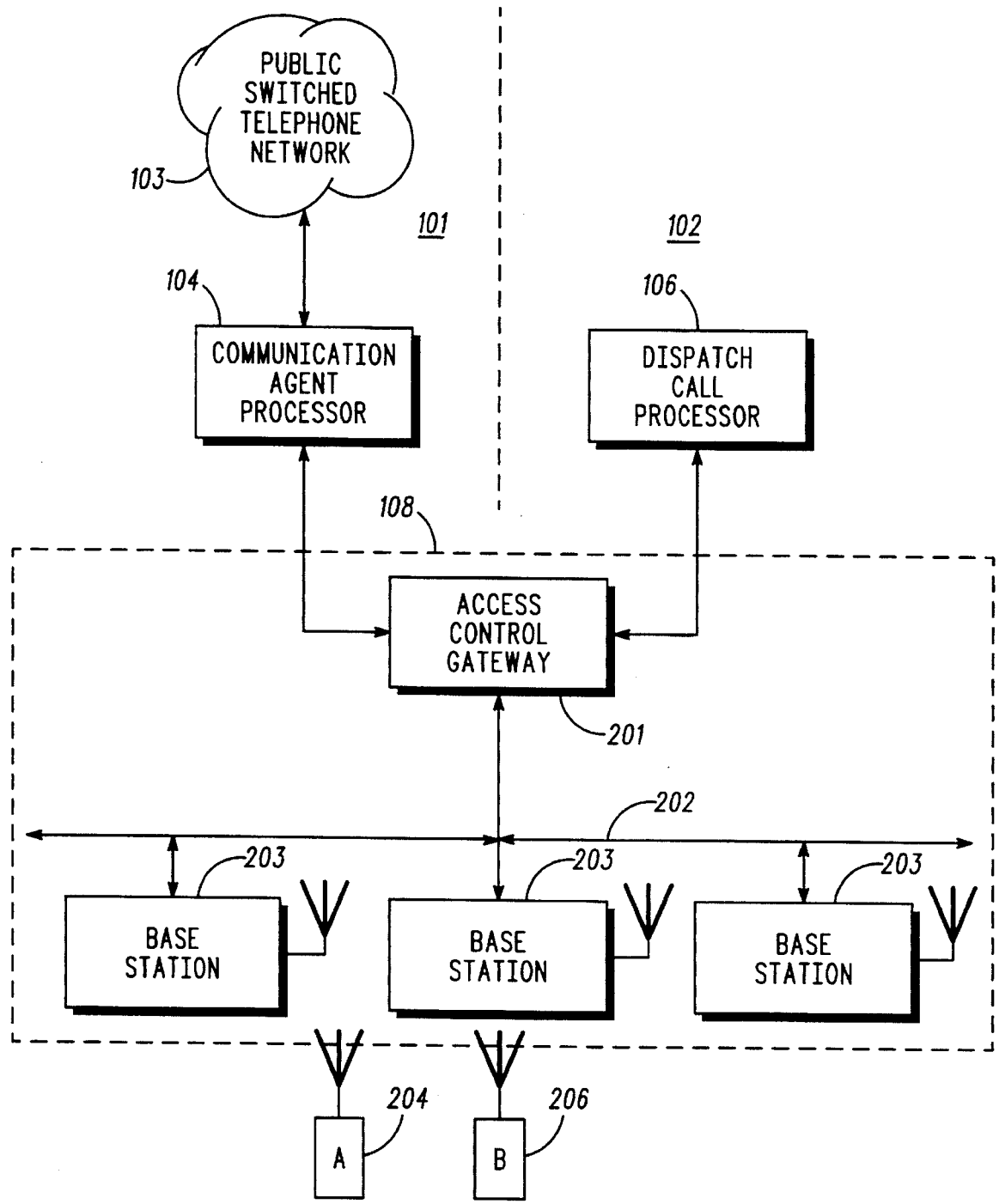
FIG. 2 comprises a somewhat more detailed block diagram of a system configured in accordance with the invention.

FIG. 2 provides more detail with respect to the shared site (site 2) (108). The shared site (108) includes an access control gateway (201) that couples to both the communication agent processor (104) and the dispatch call processor (106). In this particular embodiment, the access control gateway (201) comprises a computational platform having computational capacity and storage sufficient to support the functions described below (such platforms are numerous and well understood in the art, and therefore no further description need be provided here). The link between the access control gateway (201) and the communication agent processor (104) may comprise a high-level data link control (HDLC) as defined by the International Standards Organization. The link between the access control gateway (201) and the dispatch control processor (106) comprises a frame relay link. Both such links are well understood in the art and do not require further explanation here.

The shared site (108) also includes a plurality of base stations (203). These base stations (203) comprise radio transceivers configured to receive and transmit on appropriate frequencies and using appropriate modulation and air interface protocols as necessary to support the requirements of the services being provided. Ideally, the telephone service and dispatch service will utilize common frequencies, and other air interface specifications. When such is not the case, however, the services are still supportable provided care is taken to ensure that the base stations (203) are fully enabled to properly communicate with the communication units requiring the differing services. The access control gateway (201) couples to the base stations (203) via a bus (202). In this embodiment, the bus comprises an Ethernet link, as well understood in the art.

So configured, the shared site (108) provides radio communication services to mobile communication units (204 and 206). (It should be understood that, as used herein, the expression "communication units" refers both to portable units, mobile units, and to fixed location units, all as commonly found in dispatch and telephone radio communication systems.)

FIG. 3 provides additional detail regarding the communication agent processor (104) and the dispatch call processor (106). The communication agent processor (104) includes a mobile switching center (301), a base site controller (302), and a telephone data base (303). The mobile switching center (301) and base site controller (302) can be as provided in digital cellular Global System for Mobile Communications (GSM) systems as well understood in the art. So provided, the mobile switching center (301) interfaces with the public switched telephone network (103) and the base site controller (302), and controls the provision of telephone services to communication units being serviced by the system (101). The telephone data base (303) also couples to the mobile switching center (301), and provides information that the mobile switching center (301) utilizes to provide requested services. In particular, this data base (303) includes information regarding current telephone operability states regarding communication units that are serviced, or are serviceable by, the telephone system (101). For example, present site location, present telephone call activity, billing information, and roaming status are all examples of such information, all as well understood in the art.

The dispatch call processor (106) includes a dispatch application processor (304), a metropolitan packet switch (306), and a dispatch data base (307). The dispatch application processor (304) can be comprised of current prior art trunked dispatch resource controllers as are well understood in the art. Such resource controllers function to allocate communication resources amongst dispatch service users, and perform the important function of alerting all members of a dispatch group that a dispatch call is imminently, (or presently) underway, so that all members of the group can participate in the call. Such platforms are readily programmable, and can be modified in accordance with the teachings set forth below to provide such services in the modified dispatch architecture disclosed. The metropolitan packet switch (306) comprises a switch, as well understood in the art, that routes audio signals between sites in order to facilitate the inclusion of group call members that are located in other sites that are also serviced by the dispatch system (102). The dispatch data base (307) couples to the dispatch application processor (304) and includes information regarding current dispatch operability states of communication units that are serviced by the dispatch system (102). Such information includes, for example, individual I.D., group I.D., alias information, roaming status, priority information, and so forth, all as well understood in the art.

So configured, the communication system (100) provides two very different communication services (telephone and dispatch) by provision of two independent service provision platforms; the communication agent processor (104) to support telephone services and the dispatch call processor (106) to support dispatch call services. These two separate platforms include data bases that contain information regarding communication units that are serviced by each particular system. Therefore, by way of example, a particular communication unit that is capable of conducting both telephone and dispatch communications will have information pertaining to it stored in both data bases (303 and 307). Only information pertaining to its telephone operability, however, will be maintained in the telephone data base (303) and only information pertaining to its dispatch operability will be maintained in the dispatch data base (307).

With the above infrastructure embodiment in mind, the operation of the system (100) to establish a telephone communication as sourced by a particular communication unit will now be described.

Certain aspects of the telephone call set-up process will now be described with reference to FIG. 4 and FIG. 5. The access control gateway telephone set-up process begins (401) when a communication unit initiates a telephone call request by requesting (402) a dedicated control channel. If false, the telephone set-up process ends (403). However, if true, the access control gateway assigns (404) a dedicated control channel to the requesting communication unit, and a base station transmits (405) this assignment to the communication unit.

Once the communication unit receives this dedicated control channel assignment, it uses this assigned channel to make a telephone service request. The access control gateway receives the transmission via a base station, and determines if the communication unit has transmitted (406) a telephone service request. If not, the next action depends on how long the dedicated control channel has been assigned. If the amount of time allowed for a call expires (407), the access control gateway deassigns (408) the control channel and the telephone set-up process ends (409). If time remains (407), the control channel remains available (406) to receive service requests from the communication unit. (The amount of time provided is up to the particular system operator to select, but will typically be under one minute.)

When the communication unit initiates a service request, the access control gateway transmits (411) this request to a base site controller. (If desired, the mobile switching center can perform (412) a communication unit authentication sequence to verify that the unit has the authority to make telephone calls. During the authentication sequence, the mobile switching center polls the communication unit for specific data. The resulting information as transmitted by the communication unit is then compared with information obtained from the telephone database. Provided the two results coincide, authentication is affirmed. Additionally, if this is an encrypted system, an encryption set-up procedure can be performed (413) at this point.)

At the next step, the base site controller sends a call "in process" indicator message to the access control gateway, which passes (414) it to a base station such that the message reaches the communication unit. (The set-up process continues in FIG. 5.)

When the access control gateway receives (501) assignment approval from the base site controller, it assigns (502) a temporary control channel to support subsequent activities, and transmits (503) this assignment information. (As explained below, this assigned channel functions as a control channel on a temporary basis in order to support final set-up for the link; following this final setup, this same assigned channel will then serve as a traffic channel to support the call.) Upon confirming use of the new channel, the access control gateway transmits (504) a channel activation signal to the base site controller. The access control gateway telephone set-up process concludes (505) once the communication unit properly accesses the traffic channel.

Figure 6:
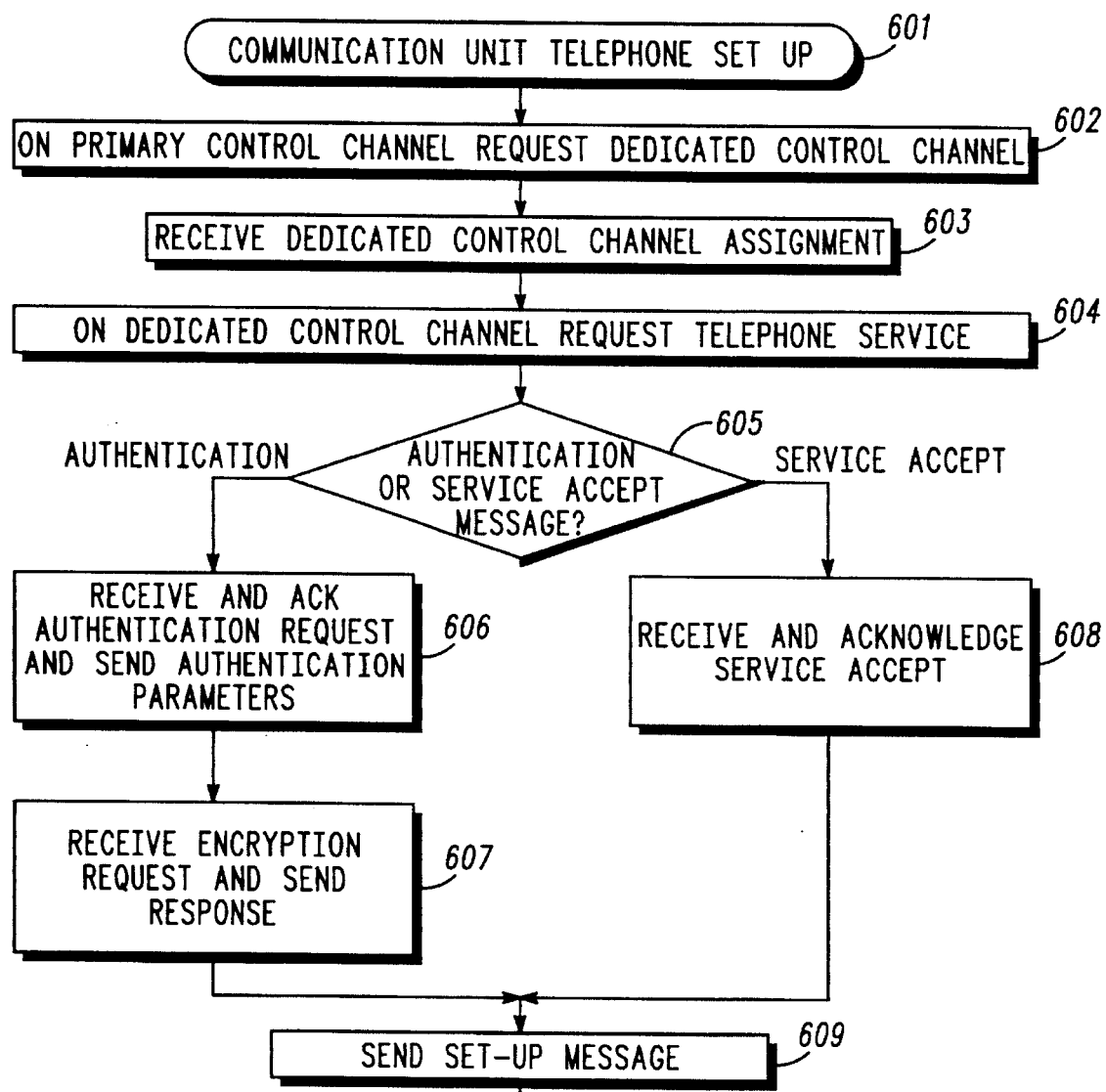
FIG. 6 comprises a flow diagram depicting operation in accordance with the invention.
Figure 7:
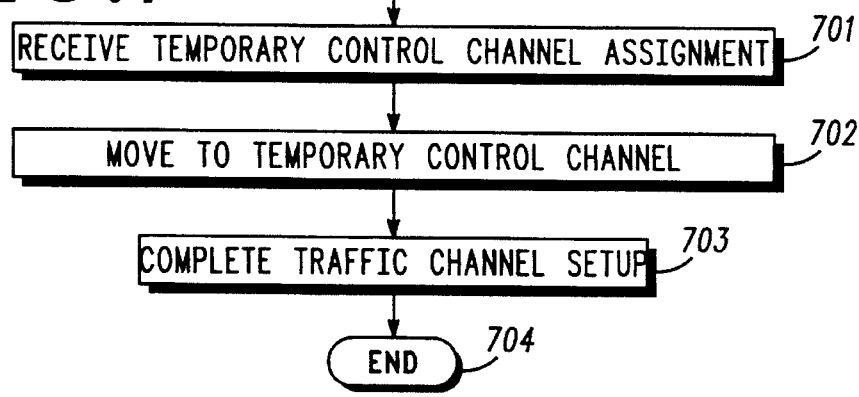
FIG. 7 comprises a flow diagram depicting operation in accordance with the invention.

In reference to FIG. 6 and FIG. 7, the communication unit telephone set-up process (601) depicted describes certain actions of the communication unit during the telephone set-up procedure described above. This process (601) begins when the communication unit sends (602) the request for a dedicated control channel using the primary control channel. Upon receiving (603) the dedicated control channel assignment from the access control gateway, the communication unit sends (604) the request for telephone service on the assigned dedicated control channel. If authentication as noted above is required, (605), the communication unit transmits (606) authentication data, such as identification. In addition, if the telephone set-up process includes encryption set-up as noted above, this process accommodates this by receiving the encryption information and reacting appropriately (607). Both authentication and encryption techniques are well understood in the art, and no further description of such processes need be described here.

If authentication is not required, the communication unit receives (608) a service acceptance message, and, if appropriate to the application, transmits an acknowledgment signal. The communication unit then transmits a set-up message over the dedicated control channel. (The set-up process continues in FIG. 7.)

When the communication unit receives (701) the temporary control channel assignment, the communication unit moves (702) from the dedicated control channel to the temporary control channel, and exchanges (703) handshake signaling on the temporary channel to confirm acceptability of the temporary channel. Lastly, the communication unit begins using the present channel as the traffic channel to perform voice communications, and the telephone call set-up process ends (704).

Figure 8:
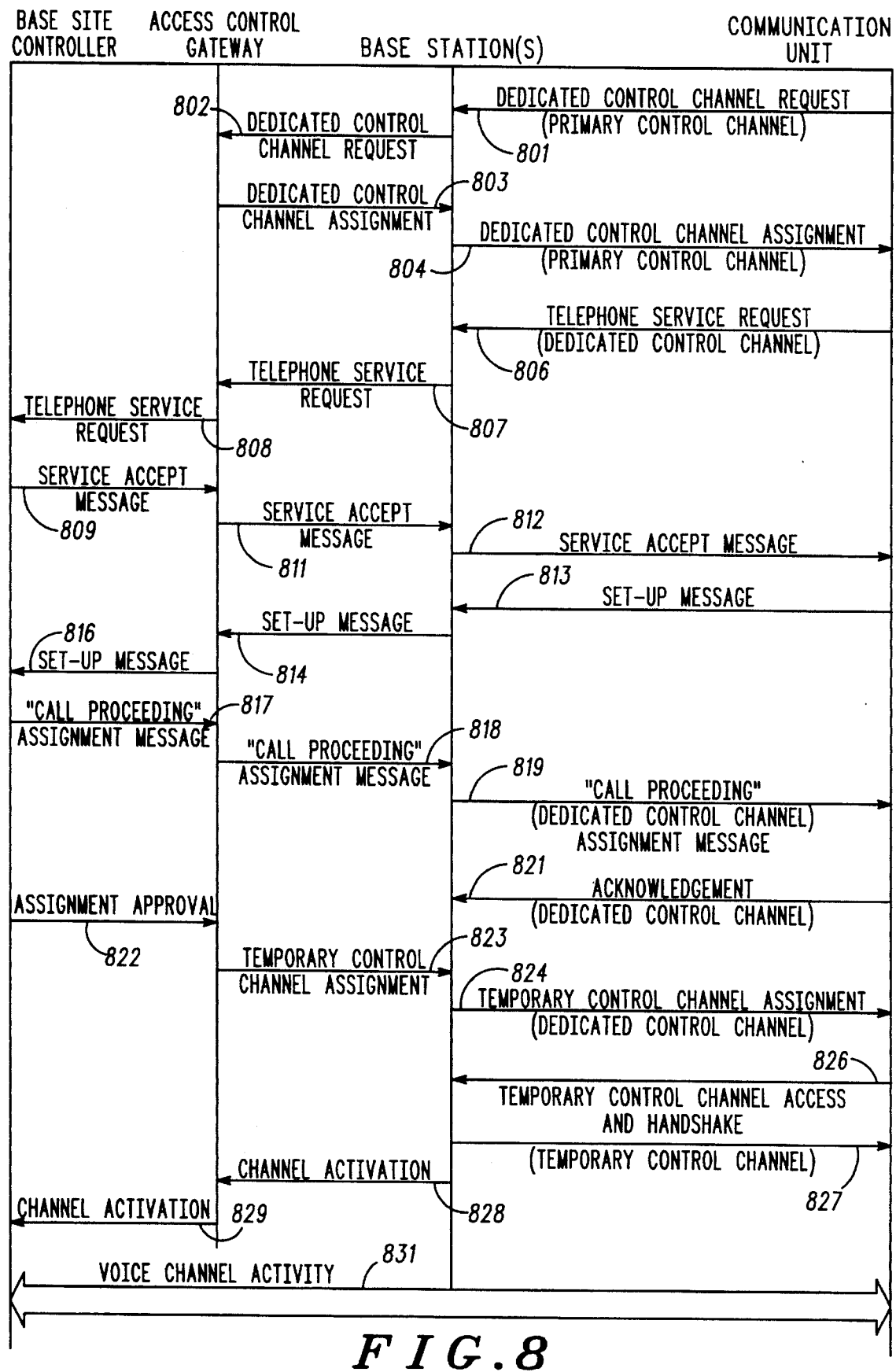
FIG. 8 comprises a timing diagram depicting operation of a system configured in accordance with the invention when providing telephone service as initiated by a wireless communication unit.

The following description of FIG. 8 combines both the communication unit and the access control gateway telephone set-up processes as described above with additional detail to present an illustrative example of a telephone call set-up. The inbound telephone set-up process begins when a communication unit transmits (801), on a primary control channel, a request for a dedicated control channel. This request for a dedicated control channel is received (802) by the access control gateway via a base station. The access control gateway assigns (803) a dedicated control channel and sends (804) this assignment via a base station on the primary control channel to the communication unit.

Once the communication unit has access to the dedicated control channel, a telephone service request is sent (806) on this channel. This request is forwarded (807) via a base station to the access control gateway and then is passed (808) on to the base site controller. The base site controller passes (not shown) the request to the mobile switching center switch. The mobile switching center sends a call request to the public switched telephone network which must return a call "in process" indicator. The base site controller passes (809) this indicator to the access control gateway, which passes (811) it to the base station, where it is sent (812) over the dedicated control channel to the communication unit. Upon receiving the "in process" indicator, the communication unit sends (813) an acknowledgment and setup message on the dedicated control channel to the base station. This set-up message is again transferred (814 and 816) back to the base site controller. In response, a "call proceeding" assignment message passes (817, 818, and 819) from the base site controller to the communication unit.

The mobile switching center eventually approves the assignment of a traffic channel, and passes this approval to the base site controller, which passes (822) it to the access control gateway. The access control gateway assigns a temporary control channel, and passes (823) the assignment to a base station, where it is sent (824) on the dedicated control channel to the communication unit. The communication unit now has access to the temporary control channel, and handshaking occurs (826 and 827). When handshaking confirms the viability of the assigned link, the access control gateway receives (828) a channel activation signal from the base station, and passes (829) this indication to the base site controller. The communication unit then switches (831) from using the assigned channel as a temporary control channel to using it as a traffic channel to perform voice communications.

In addition to telephone service, the communication system also allows communication units to travel freely throughout the total service area and originate or receive dispatch calls. The subsequent description delineates the steps involved in a typical dispatch call.

Figure 9:
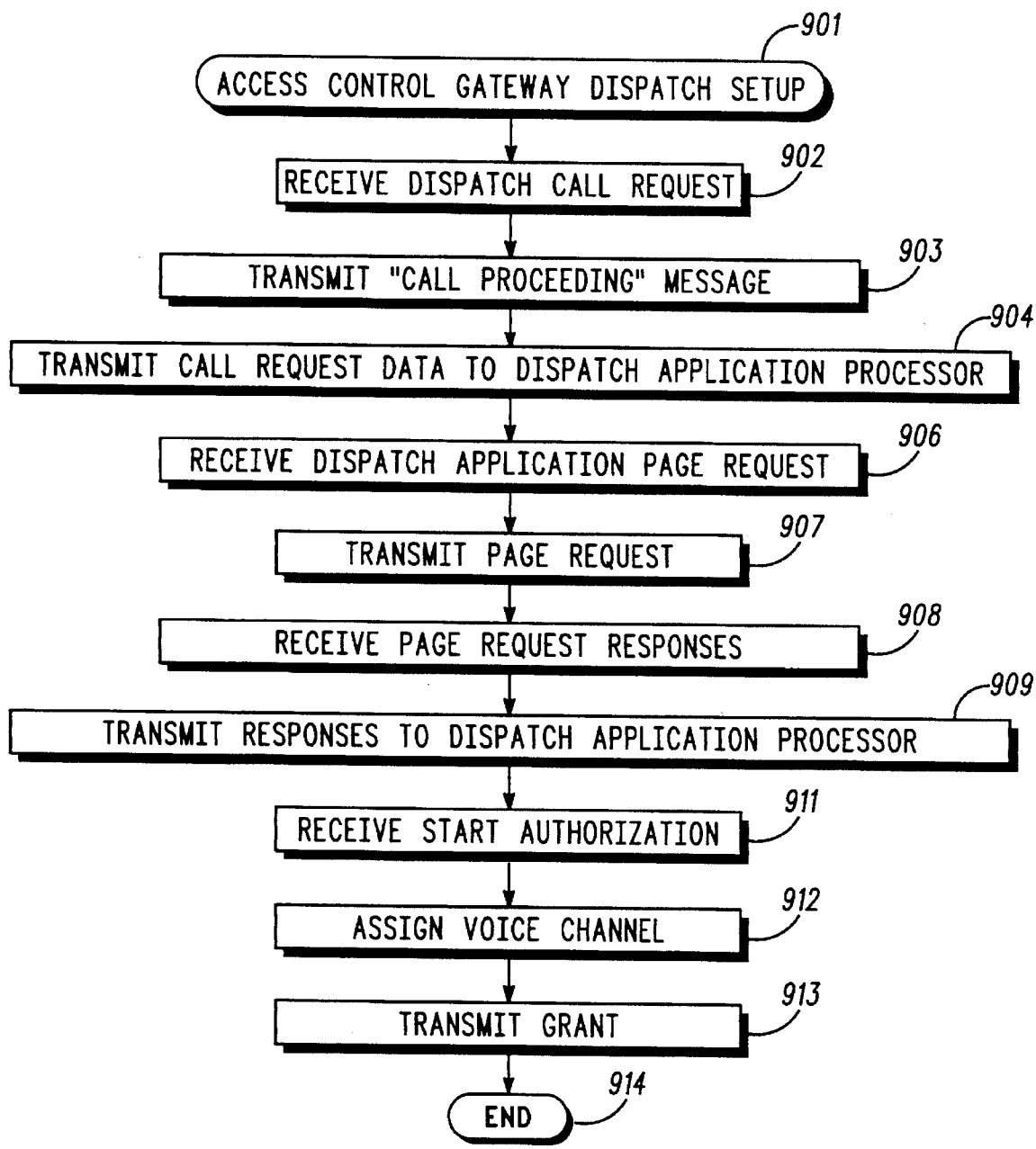
FIG. 9 comprises a flow diagram depicting operation in accordance with the invention.

Certain aspects of the dispatch call set-up process will now be described with reference to FIG. 9 the access control gateway dispatch set-up process begins (901) when the gateway receives (902) a communication unit dispatch call request via a control channel. The access control gateway sends (903) a "call proceeding" message via a base station to the communication unit, and sends (904) call request data to the dispatch application processor. The dispatch application processor issues a page request to access control gateways at each site in the communication system to identify the location of target communication units. Upon receiving this page request (906) the access control gateway in turn transmits (907) this page request, via base stations within the site governed by the access control gateway, to the communication units.

Upon receiving (908) the page responses from answering communication units, the access control gateway passes (909) them to the dispatch application processor. Next, the access control gateway receives (911) a start authorization command from the dispatch application processor. After the authorization is complete, the access control gateway assigns (912) a voice channel, and transmits (913) this channel grant to the communication unit. At this point, the access control gateway dispatch set-up is now complete (914).

Figure 10:
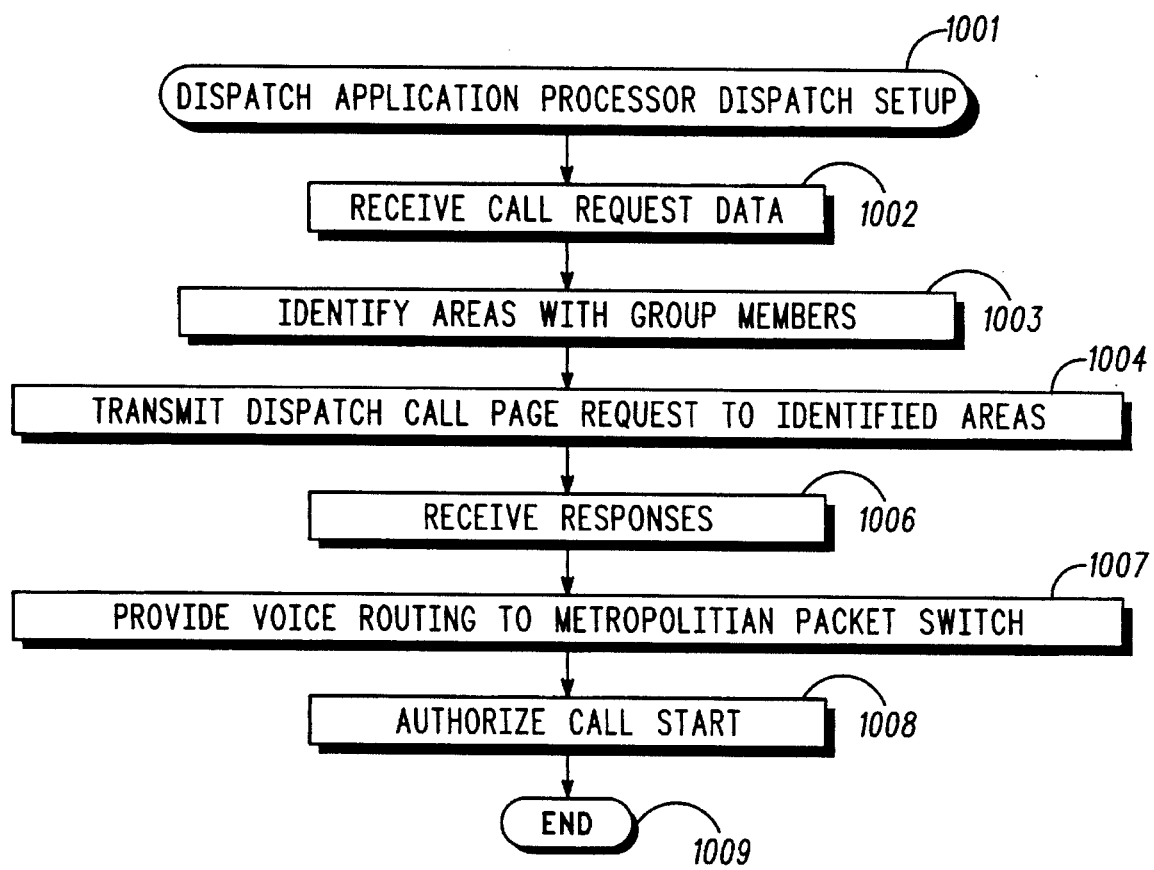
FIG. 10 comprises a flow diagram depicting operation in accordance with the invention.

With reference to FIG. 10, the depicted sequence (1001) delineates certain important aspects of the dispatch application processor dispatch call set-up process. The process begins when the dispatch application processor receives (1002) call request data from the access control gateway. The dispatch application processor validates the requester, the request, and the target(s). After the validation, the dispatch application processor identifies (1003) those areas within the system that likely contain group members that are to be included in this dispatch communication. This is done by utilizing the dispatch data base described above to obtain relevant communication unit operability states, such as group identification and roaming status. The dispatch application processor then transmits (1004) a dispatch call page request to the identified areas. The target's responses (1006) are then received providing the dispatch application processor with information as to which sites contain communication targets that are relevant to this call. When the necessary resources are available, the dispatch application processor provides (1007) voice routing instructions to the metropolitan packet switch, and authorizes (1008) the start of the call. At this point the dispatch application processor dispatch setup process concludes (1009).

Figure 11:
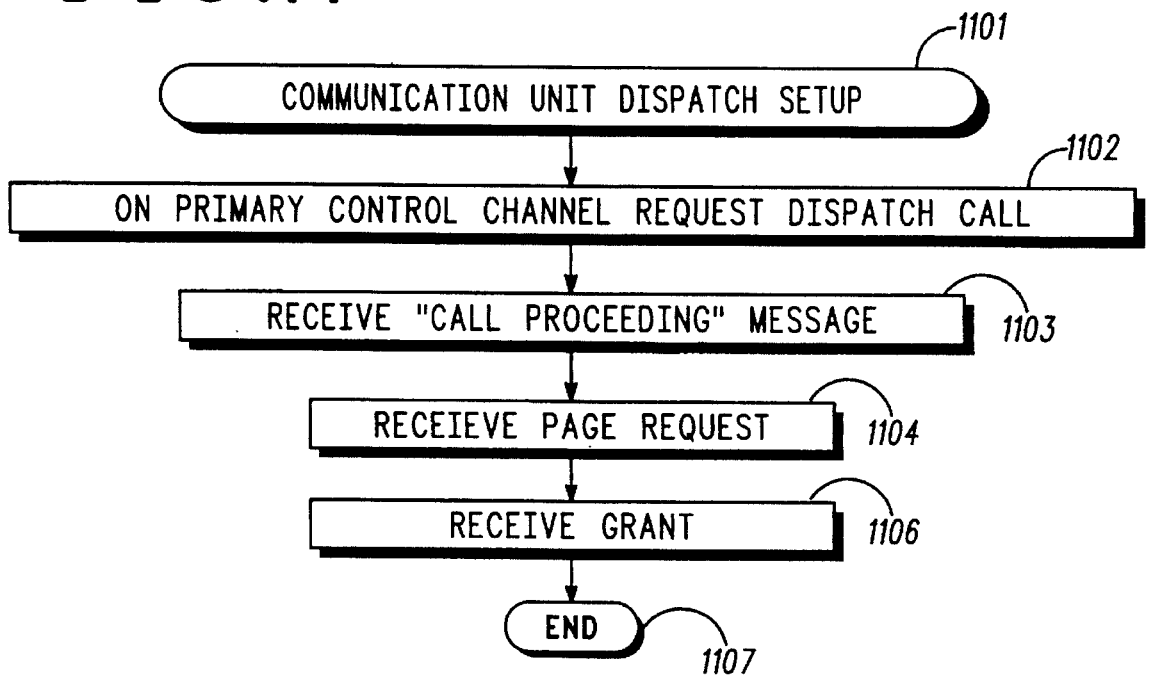
FIG. 11 comprises a flow diagram depicting operation in accordance with the invention.

Referring to FIG. 11, this flow chart sets forth certain aspects of a dispatch set-up process (1101) as used by a requesting communication unit. The process (1101) begins when a communication unit sends (1102) the request on a primary control channel for a dispatch call. Once the call has been processed by the dispatch application processor, the communication unit receives (1103) the "call proceeding" message. The communication unit receives (1104) a page request from the dispatch application processor. Finally, the requesting communication unit receives (1106) the channel grant, and the communication unit dispatch set-up process ends (1107).

Figure 12:
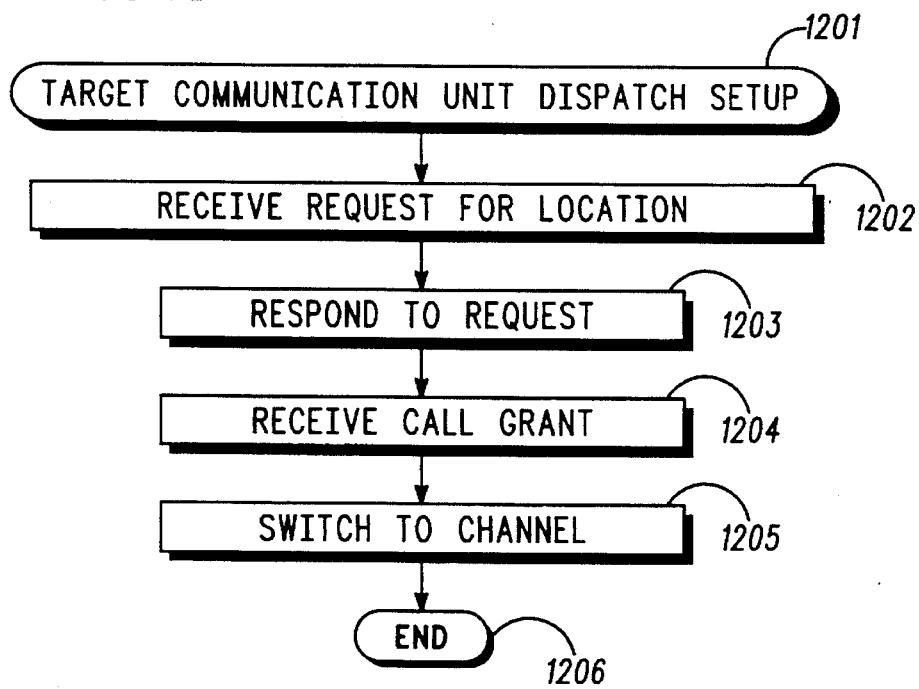
FIG. 12 comprises a flow diagram depicting operation in accordance with the invention.

Whereas the preceding describes some of the actions of the initiating communication unit during the dispatch set-up process, the following describes (1201), with reference to FIG. 12, certain actions of the target communication unit during the dispatch set-up process. The process begins when a target communication unit receives (1202) a location request on the primary control channel. The communication unit responds (1203) to the request, which response indicates to the dispatch application processor the cell or site in which the communication unit is currently receiving service. The communication unit next receives (1204) a call grant indicating a channel to be used and then switches (1205) to that channel to participate in the call. (It should be noted that the request for location is optional at the discretion of the dispatch application processor and is unnecessary when the dispatch application processor already knows the location of the communication units.) At this point the target communication unit dispatch set-up process ends (1206).

The following timing diagram, FIG. 13, combines the previously discussed dispatch set-up processes with additional detail to illustrate an example of a dispatch call set-up sequence. In this example there are three sites, each having an access control gateway, one or more base stations, and a communication unit (i.e., site 1 comprises access control gateway 1, base stations, and communication unit 1). Also, there is an additional site that includes the dispatch application processor and the metropolitan packet switch.

In this example, the set-up process begins when communication unit 1 (located at site 1) initiates (1301) a dispatch call request on a control channel, via a base station located at that site. The base station transmits (1302) this call request to access control gateway 1. Upon receiving this dispatch call request, access control gateway 1 sends (1303) a "call proceeding" message, through a base station at site 1, to initiating communication unit 1 (1304). Also, access control gateway 1 sends (1306) call request data to the dispatch application processor.

Next, the dispatch application processor sends (1307–1309) a page request to the access control gateway at each of the three sites. Upon receiving the page request, each access control gateway sends (1311) the request to an associated base station at the respective site, which request is then repeated to corresponding communication units. For example, access control gateway 2 receives (1308) a page request from the dispatch application processor. Upon receiving the page request, access control gateway 2 sends (1311) the request to a base station at site 2, which transmits (1312) the request to communication unit 2.

After receiving the page request, each communication unit sends (1313) a page response, via a base station at its respective site. This response passes (1314) from each base station to a corresponding access control gateway at the respective site, and then to the dispatch application processor (1316).

When the necessary channel resources are available for the initiating communication unit and the target communication units (in this example, they are communication unit 1 and communication units 1 and 2 respectively), the dispatch application processor routes (1319) the voice packets from the originating base station to the metropolitan packet switch, and grants (1321) the dispatch call request. This channel grant for a call start is passed to each access control gateway in the system where target communication units are located. These access control gateways then send (1322) the voice channel assignment to a respective base station which transmits (1323) the assignment to the communication unit located at the corresponding site. Once the communication unit receives the channel grant, voice activity can begin (1324).

In summary, the present embodiment provides a single communication system that provides both cellular telephone services and trunked dispatch services by sharing some, but not all, infrastructure elements. With such a method, limited frequency use and excessive infrastructure requirements of the prior art are substantially eliminated. The communication system takes advantage of the cellular network, where multiple sites can be arranged in a repeating cell pattern with the frequencies being reused within the pattern, because it permits frequency reuse with a higher attainable system capacity in conjunction with wide area coverage for a given number of frequencies. Also, since the embodiment adds the support for group dispatch to the cellular system configuration, both interconnect and dispatch services have access to advantageous base station locations.

Additionally, current practice requires a user of both services to support and maintain both a cellular subscriber unit and a dispatch radio. However, the application of this embodiment enables a single subscriber unit to support both cellular telephone interconnect and dispatch services.

We claim:

1. A communication system, comprising:

A) a plurality of base stations that support radio frequency communication channels that are used to support at least two communication services;

B) a communication agent processor operably coupled to a landline telephone network;

C) a dispatch call processor that is independent of the communication agent processor;

D) an access control gateway that is disposed between at least some of the base stations and the communication agent processor, and between the at least some of the base stations and the dispatch call processor, such that the communication agent processor and the dispatch call processor each operably couple to the at least some of the base stations through the access control gateway and wherein the access control gateway allocates the radio frequency communication channels.

2. The communication system of claim 1, wherein the communication agent processor includes at least one database that contains at least some information regarding current telephone operability states regarding subscribers serviced by the system.

3. The communication system of claim 1, wherein the dispatch call processor includes at least one database that contains at least some information regarding current dispatch operability states regarding subscribers serviced by the system.

4. The communication system of claim 1, wherein the communication agent processor includes at least one database that contains at least some information regarding current telephone operability states regarding subscribers serviced by the system, but no information regarding dispatch operability states regarding subscribers serviced by the system.

5. The communication system of claim 1, wherein the dispatch call processor includes at least one database that contains at least some information regarding current dispatch operability states regarding subscribers serviced by the system, but no information regarding telephone operability states regarding subscribers serviced by the system.

6. The communication system of claim 1, wherein the communication agent processor includes at least one database that contains at least some information regarding current telephone operability states regarding subscribers serviced by the system, but no information regarding dispatch operability states regarding subscribers serviced by the system, and the dispatch call processor includes at least one database that contains at least some information regarding current dispatch operability states regarding subscribers serviced by the system, but no information regarding telephone operability states regarding subscribers serviced by the system.

7. A communication system, comprising:

A) a plurality of base stations that support radio frequency communication channels, wherein the base stations used the radio frequency communication channels to support both telephone and dispatch communication services;

B) a communication agent processor operably coupled to a landline telephone network;

C) a dispatch call processor that is independent of the communication agent processor;

D) an access control gateway that is disposed between at least some of the base stations and the communication agent processor, and between the at least some of the base stations and the dispatch call processor, such that the communication agent processor and the dispatch call processor each operably couple to the at least some of the base stations through the access control gateway and wherein the access control gateway allocates the radio frequency communication channels.

8. The communication system of claim 7, wherein the communication agent processor includes at least one database that contains at least some information regarding current telephone operability states regarding subscribers serviced by the system.

9. The communication system of claim 7, wherein the dispatch call processor includes at least one database that contains at least some information regarding current dispatch operability states regarding subscribers serviced by the system.

10. The communication system of claim 7, wherein the communication agent processor includes at least one database that contains at least some information regarding current telephone operability states regarding subscribers serviced by the system, but no information regarding dispatch operability states regarding subscribers serviced by the system.

11. The communication system of claim 7, wherein the dispatch call processor includes at least one database that contains at least some information regarding current dispatch operability states regarding subscribers serviced by the system, but no information regarding telephone operability states regarding subscribers serviced by the system.

12. The communication system of claim 7, wherein the communication agent processor includes at least one database that contains at least some information regarding current telephone operability states regarding subscribers serviced by the system, but no information regarding dispatch operability states regarding subscribers serviced by the system, and the dispatch call processor includes at least one database that contains at least some information regarding current dispatch operability states regarding subscribers serviced by the system but no information regarding telephone operability states regarding subscribers serviced by the system.

13. A communication system, comprising:

A) a plurality of base stations that support radio frequency communication channels;

B) a communication agent processor operably coupled to a landline telephone network, wherein the communication agent processor includes at least one database that contains at least some information regarding current telephone operability states regarding subscribers serviced by the system, but no information regarding dispatch operability states regarding subscribers serviced by the system;

C) a dispatch call processor that is independent of the communication agent processor, wherein the dispatch call processor includes at least one database that contains at least some information regarding current dispatch operability states regarding subscribers serviced by the system, but no information regarding telephone operability states regarding subscribers serviced by the system;

D) an access control gateway that is disposed between at least some of the base stations and the communication agent processor, and between the at least some of the base stations and the dispatch call processor, such that the communication agent processor and the dispatch call processor each operably couple to the at least some of the base stations through the access control gateway and wherein the access control gateway allocates the radio frequency communication channels.

14. The communication system of claim 13, wherein the base stations use the radio frequency communication channels to support both telephone and dispatch communication services.

15. A communication system, comprising:

A) a plurality of base stations that support radio frequency communication channels to support both telephone interconnect service and dispatch communications service;

B) a communication agent processor operably coupled to a landline telephone network, wherein the communication agent processor includes at least one database that contains at least some information regarding current telephone operability states regarding subscribers serviced by the system, but no information regarding dispatch operability states regarding subscribers serviced by the system;

C) a dispatch call processor that is independent of the communication agent processor, wherein the dispatch call processor includes at least one database that contains at least some information regarding current dispatch operability states regarding subscribers serviced by the system, but no information regarding telephone operability states regarding subscribers serviced by the system;

D) an access control gateway that is disposed between at least some of the base stations and the communication agent processor, and between the at least some of the base stations and the dispatch call processor, such that the communication agent processor and the dispatch call processor each operably couple to the at least some of the base stations through the access control gateway and wherein the access control gateway allocates the radio frequency communication channels.

16. A method to source a telephone call from a communication unit, comprising the steps of:

A) transmitting to an access control gateway, which access control gateway is operably coupled between a plurality of base stations that support radio frequency communication channels and a communication agent processor that is itself coupled to a landline telephone network, and between the plurality of base stations and a dispatch call processor that is independent of the communication agent processor, via a first base station, a first channel request;

B) receiving from the access control gateway via the first base station a first channel assignment;

C) transmitting to the access control gateway via the first channel a telephone service request;

D) receiving via the first channel a temporary channel assignment, which assignment is provided by the communication agent processor;

E) signaling on the temporary channel to confirm acceptability of the temporary channel;

F) using the temporary channel toe support the telephone call.

17. The method of claim 16, wherein the communication agent processor includes at least one database that contains at least some information regarding current telephone operability states regarding subscribers serviced by the system, but no information regarding dispatch operability states regarding subscribers serviced by the system, and wherein, in step D, the at least one database is utilized when making the assignment of the temporary channel.

18. A method comprising the steps of:

to source a telephone call from a communication unit:

A) transmitting to an access control gateway, which access control gateway is operably coupled between a plurality of base stations that support radio frequency communication channels and a communication agent processor that is itself coupled to a landline telephone network, and between the plurality of base stations and a dispatch call processor that is independent of the communication agent processor, via a first base station, a first channel request;

B) receiving from the access control gateway via the first base station a first channel assignment;

C) transmitting to the access control gateway via the first channel a telephone service request;

D) receiving via the first channel a temporary channel assignment, which assignment is provided by the communication agent processor;

E) signaling on the temporary channel to confirm acceptability of the temporary channel;

F) using the temporary channel to support the telephone call;

to source a dispatch call from the communication unit:

G) transmitting to the access control gateway via the base station a dispatch call request;

H) receiving a channel assignment sourced by the dispatch call processor that specifies an identified channel;

I) using the identified channel to support the dispatch call.

19. The method of claim 18, wherein the communication agent processor includes at least one database that contains at least some information regarding current telephone operability states regarding subscribers serviced by the system, but no information regarding dispatch operability states regarding subscribers serviced by the system, and the dispatch processor includes at least a second database that contains at least some information regarding current dispatch operability states regarding subscribers serviced by the system, but no information regarding telephone operability states regarding subscribers serviced by the system, and wherein:

in step D, the one database is utilized when making the assignment of the temporary channel; and in step H, the second database is utilized when making the assignment of the identified channel.

* * * * *